Nov. 26, 1957     J. C. BORGER     2,814,539
BEARING RETAINING MEANS
Filed April 15, 1954
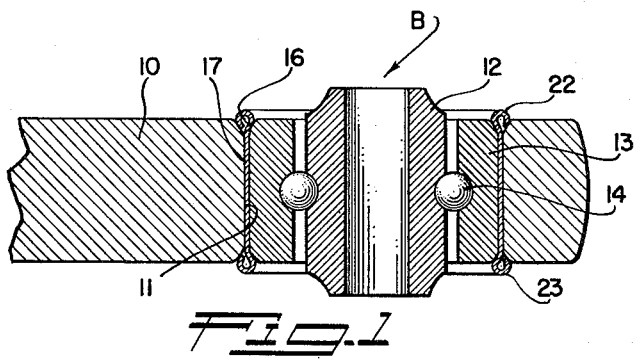
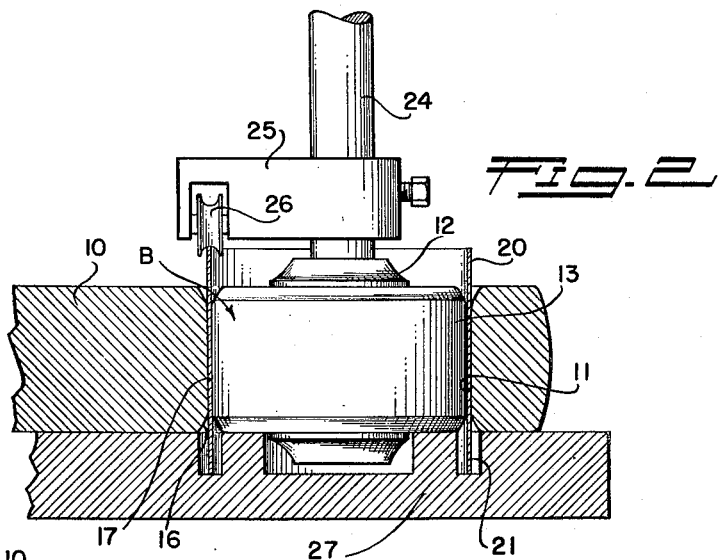
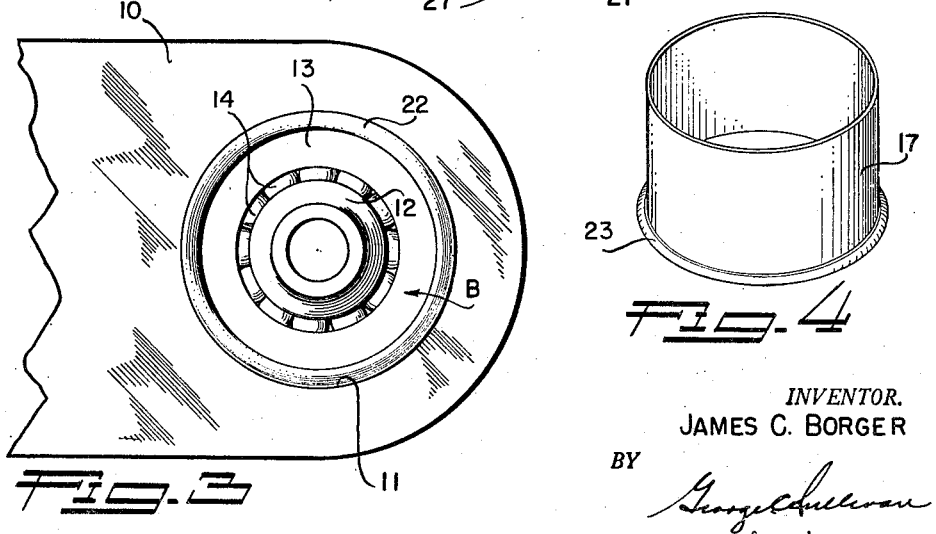
INVENTOR.
JAMES C. BORGER
BY
*George C. Sullivan*
Agent

United States Patent Office 2,814,539
Patented Nov. 26, 1957

2,814,539

BEARING RETAINING MEANS

James C. Borger, Burbank, Calif., assignor to Lockheed Aircraft Corporation, Burbank, Calif.

Application April 15, 1954, Serial No. 423,492

2 Claims. (Cl. 308—178)

This invention relates to anti-friction bearing installations and relates more particularly to means for retaining bearings in their operative positions.

In installing bearings it has been the practice to use lock rings, screwed-on plates or staking to retain the bearings in place. Where the conservation of weight and/or space are important factors, for example in aircraft control mechanisms, it is seldom practical to use lock rings or screwed-on plates to retain the bearings since these devices usually increase materially both the size and weight of the bearing installation. In such situations it has been the practice to stake the bearings in place. This involves the use of staking tools to deform or displace the material of the bearing supporting part or member, usually at points or regions spaced about the periphery of the bearing, so as to interfere with or grip the bearing to hold the same in its opening. The staking operations oftentimes result in distortion and consequent malfunctioning of the bearings. Further, bearings that have been staked are not easily intentionally removed and at best the staked bearings can be removed and replaced only once or twice. Staking, which requires the displacement of the surrounding metal, cannot be used satisfactorily where the bearings are carried by members of magnesium, high heat treat steel, or the like.

It is a general object of the present invention to provide simple, practical and dependable bearing retainers.

Another object of the invention is to provide bearing retaining means that add little or no weight to the bearing installation and that do not appreciably increase the size of the assembly. The bearing retaining means of the invention does not necessitate the use of retaining plates, screws or other attaching devices, lock rings or other parts which would increase the weight or size of the installation.

A further object of this invention is to provide bearing retainers that completely avoid the necessity for staking the bearings, that is the need to deform or displace the metal of the bearing carrying member in the vicinity of the bearing. Accordingly, the bearing may readily be installed in parts or members constructed of material that cannot be satisfactorily staked. Furthermore, where staking or comparable operations are avoided, the bearings are not deformed or damaged in any way during their installation or subsequent removal.

A still further object of the invention is to provide bearing retaining means that allows for the repeated intentional removal or replacement of the bearings without damaging or injuring in any way the bearings or the bearing supporting member or part.

Other objectives and features of the invention will become apparent from the following detailed description of typical preferred embodiments throughout which reference will be made to the accompanying drawings wherein:

Figure 1 is a vertical detailed sectional view of a bearing installed or retained in a typical part or member in accordance with the invention;

Figure 2 illustrates one suitable means or tool for spinning or forming a roll or bead on one end of the retainer of the invention;

Figure 3 is a top or plan view of the bearing installation or assembly; and

Figure 4 is a perspective view of a bearing retainer of the invention having one preformed roll or bead at an end thereof.

The bearing retainers of the invention are, of course, suitable for use with bearings of various types, sizes, etc. and with bearings installed in or associated with mechanisms, members and instrumentalities of practically all kinds. I will describe below typical retainers of the invention as used with the simple conventional bearing and bearing carrying member illustrated in the drawings, it being understood that the invention is not to be construed as limited or restricted to use with these conventional elements or any other specific bearings or members. The member 10, shown in Figures 1, 2 and 3 may be the end portion of a rod, a bearing supporting bracket or other like part. A vertical or transverse opening 11 is provided in the member 10 to receive the bearing B. The particular bearing illustrated is a simple ball bearing having an inner race or ring 12, an outer race or ring 13 and one or more rows of balls 14, or other anti-friction elements operating in opposing grooves in the rings as is conventional in such bearings. The axial dimension or length of the outer ring 13 is substantially the same as the thickness of the member 10 so that the ends of the outer ring may be substantially coincident with the planes occupied by the side surfaces of the member.

As best shown in Figure 2, the outer corners of the bearing B are chamfered, beveled, or rounded off, this being typical or standard practice with this general class of bearing. The opposite ends of the opening 11 in the member 10 are slightly flared, countersunk or beveled approximately to an extent corresponding with the beveled corners of the bearing ring 13. The beveled corners of the ring 13 and the flared or beveled ends of the opening 11 mate or register to leave annular channels or grooves 16. As illustrated in Figures 1 and 2, these grooves 16 are generally V-shape in transverse cross section, flaring outwardly toward the faces or sides of the assembly. In accordance with the invention the diameter of the opening 11 in the member 10 is larger than the outside diameter of the bearing 13, for example in a typical case it may be between 0.010" and 0.040" larger in diameter than the bearing ring.

The bearing retainer 17 of the invention is initially a simple length of tubing of an appropriate malleable material. For example, the retainer 17 may be constructed of stainless steel, brass, aluminum alloy, mild steel, or the like, and the material selected will, of course, depend upon the intended use or application of the retainer. The tubular stock of which the retainer 17 is constructed is preferably uniform in wall thickness throughout and its walls are quite thin. Thus in a typical retainer of the invention the wall thickness may be between 0.005" and 0.020". The bearing B and the retainer 17 are assembled in the opening 11, as shown in Figure 2, with the retainer surrounding the bearing so that the retainer is engaged between the external surface of the outer bearing ring 13 and the wall of the opening 11. The parts are proportioned and related so that the retainer 17 snugly fits the opening 11 and the bearing B is in turn accurately received in the retainer. It will be noted in Figure 2 that the tubular retainer is initially considerably longer than the bearing B to have end regions or portions 20 and 21 protruding beyond the bearing and the sides of the member 10. After the bearing B and the retainer 17 have been assembled in the opening 11, rolls or beads 22 and 23 are formed on the ends of the retainer to engage in the above described annular grooves 16 to retain the bearing B in position.

Figure 2 illustrates in a general or diagrammatic manner one simple effective way of forming or spinning the bead 22 on the retainer 17. A rotatable mandrel 24 is provided adjacent its lower end with a head or arm 25 which, in turn, carries a spinning roller 26. The roller 26 has a concave periphery and is rotatably supported in the arm for free rotation about an axis which is generally radial with respect to the rotatable mandrel 24. The mandrel 24 may be rotatably engaged or centered in the bearing B although this is not essential. With the retainer end portion 21, the bearing B and the member 10 engaged on an appropriate abutment 27, the mandrel 24 is rotated and fed downwardly so that the roller 26 engages and acts on the other end portion 20 of the retainer. As the mandrel 24 is rotated and fed downwardly the roller 26 rolls or spins the protruding retainer portion 20 into the roll or bead 22 which seats in and generally conforms with the related groove 16. Upon completion of the annular bead 22 the above described operations are repeated with the roller 20 acting on the opposite end portion 21 of the retainer to form or roll the bead 23 to tightly nest or fit in the other annular groove 16. In practice the spinning of the rolls or beads 22 and 23 may be easily and quickly performed and the beads may be spun or formed so as to tightly engage and bear in the annular grooves 16. This engagement of the beads 22 and 23 in the grooves 16 dependably retains the retainer 17 and the bearing B in the opening 11, the beads being so shaped and proportioned that they bear against both the corner surfaces of the bearing B and the chamfered or beveled surfaces of the member 10 at the ends of the opening 11 to form positive dependable stops or retaining enlargements at the opposite ends of the bearing. From an inspection of Figure 1 it will be seen that the rolls or beads 22 and 23 are so shaped and so engaged in the grooves 16 that loosening or straightening out of the beads under the influence of even relatively heavy axial loads is dependably resisted.

In certain situations or installations one end of the bearing B or one side of the member 10, or its equivalent, may be inaccessible or difficult of access. In such situations it is preferred to form one of the rolls or beads, for example the bead 23, on the retainer 17 prior to assembling the retainer and bearing B in the opening 11. With this preformed bead 23 properly seated in its respective annular groove 16, the bead 22 is spun on the other end of the retainer to bear in its respective groove 16. Figure 4 of the drawings illustrates the retainer 17 provided with the preformed bead 23 adapting it for use in such situations where one side of the assembly is inaccessible or difficult of access. The rolling or spinning of the second bead 22 on the retainer 17 completes the assembly and retention of the bearing B in the opening 11.

From the foregoing it will be seen that I have provided a simple, inexpensive and easily constructed bearing retainer means. With the rolls or beads 22 and 23 correctly formed to tightly bear in their respective grooves 16 the bearing B is securely and dependably retained in the member 10. It is to be particularly observed that little or no weight is added to the assembly by reason of the retainer means and no additional space is required. The use of screws, plates, lock rings, and the like, is obviated. Furthermore, the bearing retaining means of the invention does not necessitate staking of the member 10 or any other parts so that there is little or no likelihood that the bearing B will be deformed or otherwise injured during its installation. If it becomes necessary to remove the bearing B this is easily accomplished by forcibly pressing the same axially relative to the member 10, which action will straighten out one of the rolls or beads 22 or 23 sufficiently to permit free removal of the bearing and the retainer 17. Removal of the bearing in this manner does not injure either the bearing or the member 10, there being no scoring or damaging of the walls of the opening 11. The reconditioned or replacement bearing then may be installed and retained by employing a retainer 17 of the invention in the manner above described.

Having described only typical forms of the invention I do not wish to be limited to the specific details herein set forth, but wish to reserve to myself any variations or modifications that may appear to those skilled in the art and fall within the scope of the following claims.

I claim:

1. An assembly including a member having an opening extending through it from one side to the other, a bearing arranged in the opening to have its ends at said sides of the member, the ends of the opening and the outer corners of the bearing being beveled to leave annular grooves, a tubular retainer engaging around the bearing to extend through the opening, and annular beads on the opposite ends of the retainer engaging in the grooves to hold the bearing against axial movement, each bead having a portion integrally joining the retainer and curving radially inward and axially outward therefrom to bear on a beveled end of said bearing and each bead having a portion curved radially outward and axially inward to bear on a beveled end of said opening and terminating at an edge which constitutes an end of the material of which the retainer is constructed, the beads being constructed so that axial loads on the bearing tend to tighten the beads in said grooves, the engagement of said bead portions with said beveled ends of said bearing and opening causing said loads to urge said edges radially inward toward the bearing.

2. An assembly including a member having an opening extending through it from one side to the other, a bearing arranged in the opening to have its ends at said sides of the member, the ends of the opening and the outer corners of the bearing being beveled to leave annular grooves, a tubular retainer engaging around the bearing to extend through the opening, and annular beads of circular tube form in cross section on the opposite ends of the retainer engaging in the grooves to hold the bearing against axial movement, each bead having a portion integrally joining the retainer and curving radially inward and axially outward therefrom to bear on a beveled end of said bearing and each bead having a portion curved radially outward and axially inward to bear on a beveled end of said opening and terminating at an edge which constitutes an end of the material of which the retainer is constructed, the beads being constructed so that axial loads on the bearing tend to tighten the beads in said grooves, the engagement of said bead portions with said beveled ends of said bearing and opening causing said loads to urge said edges radially inward toward the bearing.

References Cited in the file of this patent

UNITED STATES PATENTS

| | | |
|---|---|---|
| 489,295 | Elliott | Jan. 3, 1893 |
| 1,532,784 | Staples | Apr. 7, 1925 |
| 1,903,776 | Clark | Apr. 18, 1933 |
| 2,324,676 | Butterfield | July 20, 1943 |
| 2,596,771 | Harbour | May 13, 1952 |

FOREIGN PATENTS

| | | |
|---|---|---|
| 24,222 | Great Britain | 1910 |
| 476,638 | Italy | Dec. 17, 1952 |
| 584,769 | France | Nov. 27, 1924 |